Aug. 25, 1936.  H. A. MONTEITH  2,052,483
BUMPER RACK
Filed June 6, 1935   2 Sheets-Sheet 1
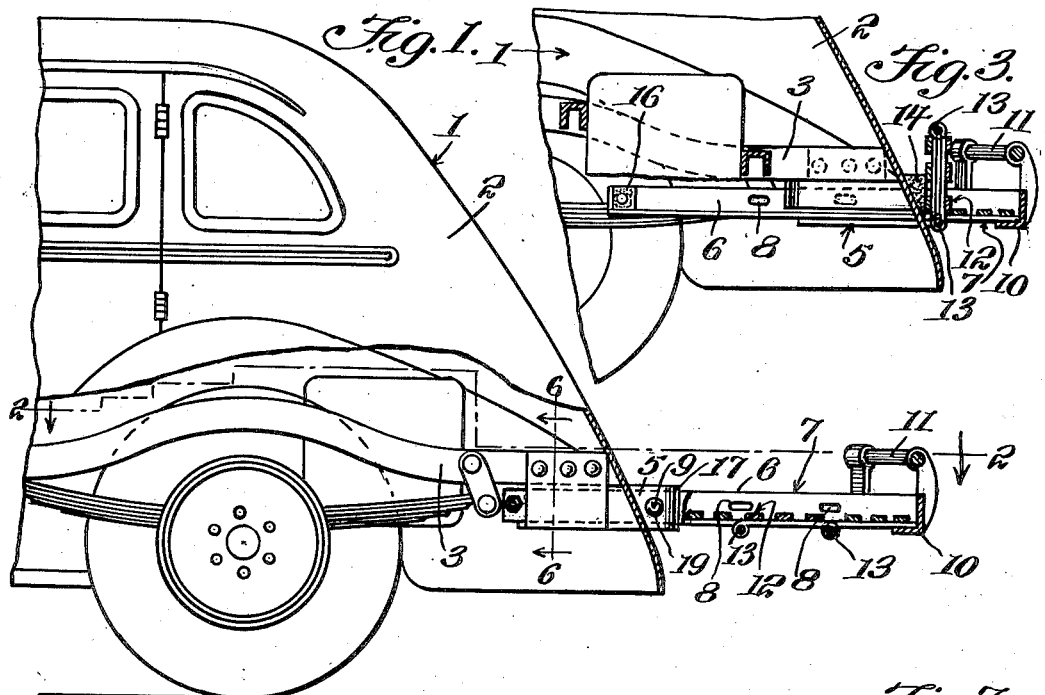
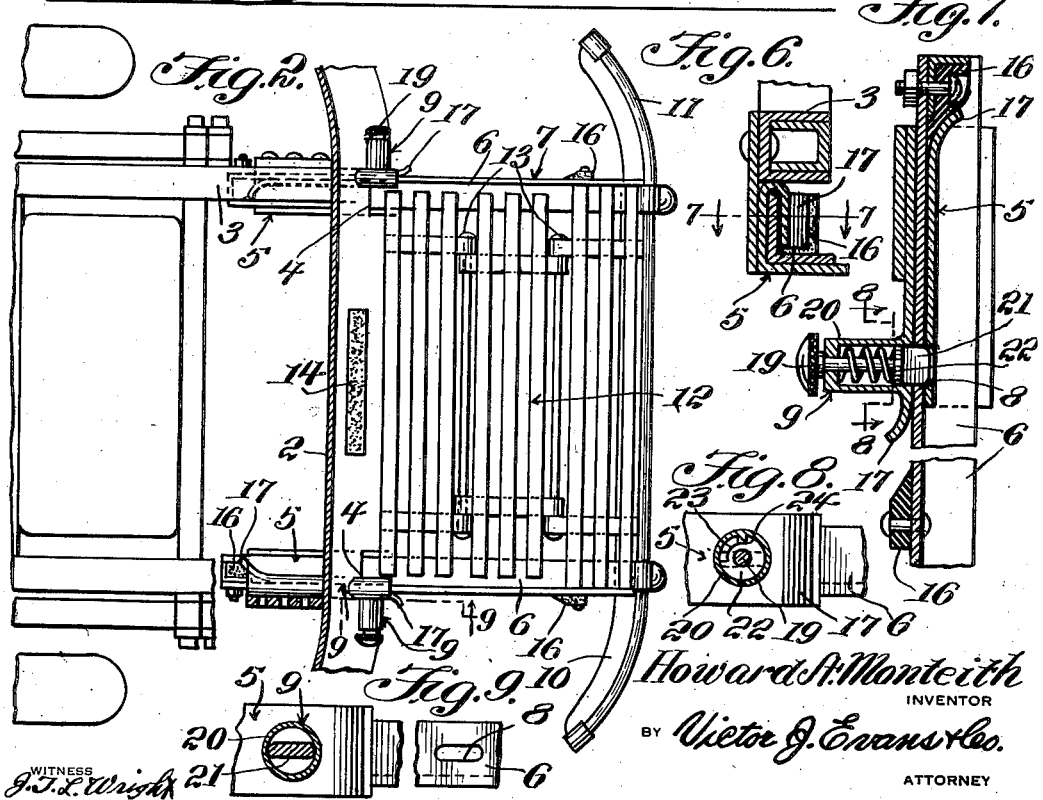

Aug. 25, 1936.  H. A. MONTEITH  2,052,483
BUMPER RACK
Filed June 6, 1935  2 Sheets-Sheet 2
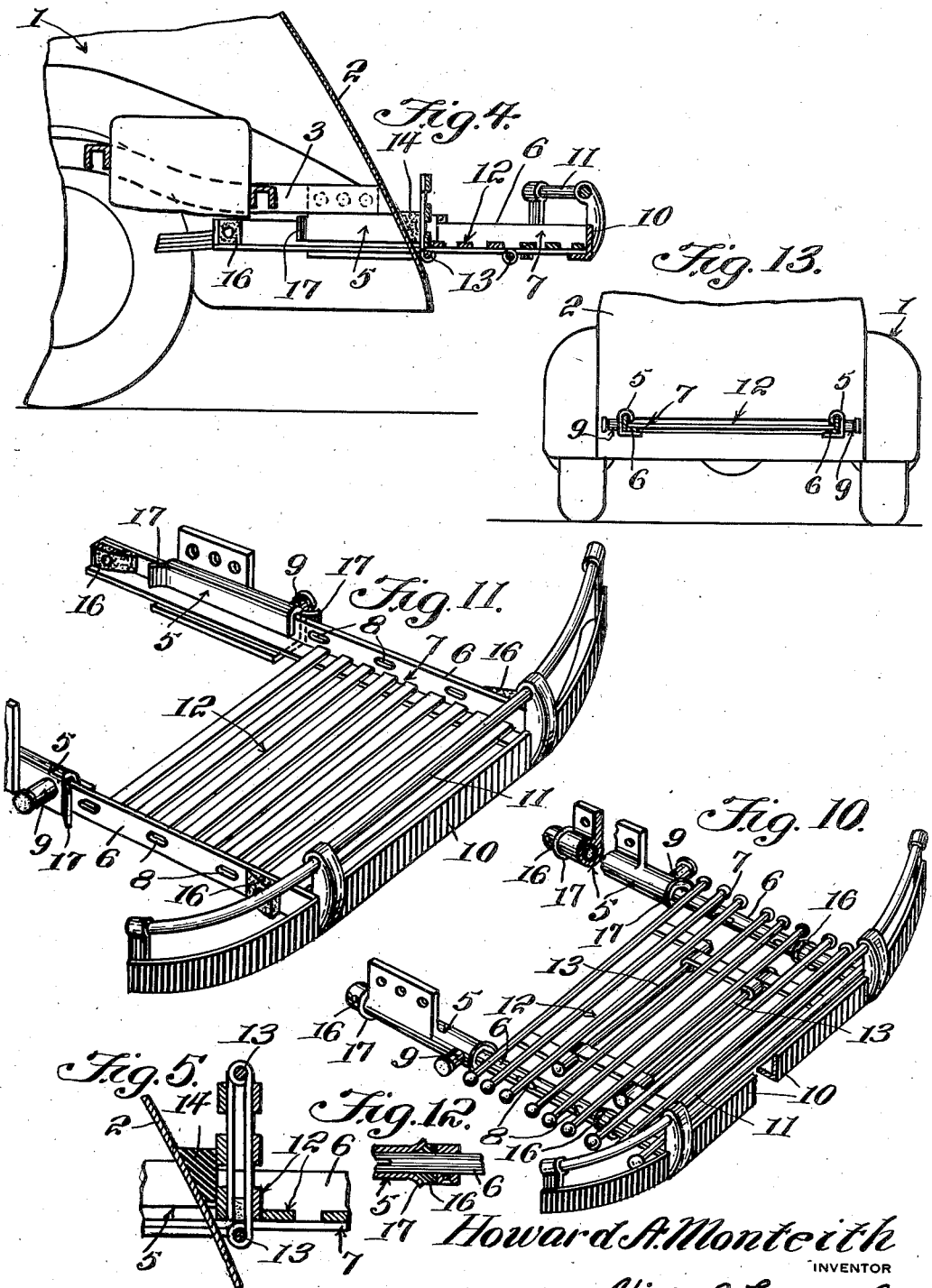
Howard A. Monteith
INVENTOR
BY Victor J. Evans & Co.
ATTORNEY
WITNESS J. T. L. Wright Patented Aug. 25, 1936

2,052,483

UNITED STATES PATENT OFFICE 2,052,483

BUMPER RACK

Howard A. Monteith, Eustis, Fla.

Application June 6, 1935, Serial No. 25,335

2 Claims. (Cl. 293—55)

This invention relates to combined luggage carriers and bumpers for motor vehicles and has for the primary object the provision of a device of this character which may be readily adapted to a motor vehicle and may be easily adjusted to vary its load carrying capacity and when adjusted for its minimum load capacity will position the bumper in close proximity to the vehicle body to provide efficient protection thereto without excessive protrusion from the body and still permit small articles or devices, such as golf bags and the like to be accommodated by the carrier.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation, partly in section, showing a combined luggage carrier and bumper adapted to a motor vehicle and constructed in accordance with my invention.

Figure 2 is a sectional view taken on the line 2—2 of Figure 1.

Figure 3 is a fragmentary vertical sectional view showing the combined luggage carrier and bumper adjusted to its minimum load carrying capacity.

Figure 4 is a similar view showing another adjustment of the combined luggage carrier and bumper.

Figure 5 is a fragmentary sectional view showing the folding of the bed of the combined luggage carrier and bumper.

Figure 6 is a sectional view taken on the line 6—6 of Figure 1.

Figure 7 is a sectional view taken on the line 7—7 of Figure 6.

Figure 8 is a sectional view taken on the line 8—8 of Figure 7.

Figure 9 is a detail sectional view taken on the line 9—9 of Figure 2.

Figure 10 is a perspective view, partly in section, showing a modified form of my invention.

Figure 11 is a perspective view showing another modified form of my invention.

Figure 12 is a detail sectional view showing a cushion stop for the form of my invention disclosed by Figure 10.

Figure 13 is a fragmentary end elevation illustrating my modified form of invention adapted to a motor vehicle.

Referring in detail to the drawings, the numeral 1 indicates a fragmentary portion of a motor vehicle, the body thereof being indicated by the character 2 and the chassis or side members thereof by the numeral 3. In the present day design of motor vehicle bodies, the rear portion of the body projects downwardly below the side members 3 in the form of a skirt and the latter to adapt my invention thereto is provided with spaced slots 4, through which protrude brackets 5 and the latter are secured to the side members 3 of the chassis. The brackets 5 are of channel iron construction to slidably support side members 6 of the luggage carrier 7. The side members 6 are of angle iron construction and are provided with relatively spaced slots 8 to be engaged by fasteners 9 carried by the brackets for maintaining the luggage carrier 7 in various adjusted positions. The side members 6 at their outer ends are connected by a member 10 providing to the vehicle a bumper. The member 10 may be of any desired artistic design and its connection with the side members 6 of the luggage carrier may be either integral or some suitable yieldable connection (not shown). Disposed above and paralleling the member 10 is a bar 11 which increases the width of the bumper and further adds to its artistic appearance. Suitable connections are provided between the members 10 and 11. The bar 11 also provides a hand grip so that the luggage carrier 7 may be moved inwardly and outwardly with respect to the body 2 of the motor vehicle.

The luggage carrier 7 includes in its construction a bed 12 formed from spaced elements arranged in groups or sections with the elements of one group suitably fixed to the side members 6. The groups or sections of the bed are joined by hinges 13 whereby a pair of sections or groups of the bed may be folded upwardly against each other when the luggage carrier is moved inwardly with respect to the body, assuming a position as shown in Figure 3, leaving a limited load carrying space between the bumper and folded sections of the bed to accommodate small articles. The skirt of the body 2 is equipped with a cushion block or bumper 14 to be abutted by the sections or groups of the bed when folded.

Instead of constructing the bed 12 of sections, it may be made, as shown in Figure 11, that is, each slat or element is suitably secured to the side members 6 so that the bed will be non-foldable and when employing this construction the skirt of the motor vehicle body is provided with a single slot, as shown in Figure 13, instead of a pair of slots 4, as shown in Figure 2. The bed in this form slides inwardly through the slot of the motor vehicle body when the luggage carrier is adjusted to assume its minimum load carrying capacity. The combined bumper and carrier when adjusted in the latter-named position arranges the bumper element or member 10 in close proximity to the skirt of the motor vehicle body so as to afford maximum protection thereto without excessive protrusion of the device at the rear of the motor vehicle. The combined luggage carrier and bumper also may be adjusted to assume a position, as shown in Figure 4, with one of the sections of the bed folded or positioned to extend vertically and resting against the cushion bumper 14 of the skirt.

The latch members 9 will securely lock the combined luggage carrier and bumper in its various adjusted or extended positions with respect to the motor vehicle body as well as securing the combined luggage carrier and bumper in its minimum load carrying position.

Substantially wedge-shaped stops 16 are secured to the side members 6 of the luggage carrier adjacent the ends thereof and cooperate with flared ends 17 of brackets 5 in limiting the inward and outward movement of the combined luggage carrier and bumper. The stops 16 are constructed of rubber or any other suitable material and are detachably secured to the members 6 so that they may be removed when desiring to withdraw the members 6 from the brackets in order to detach the combined luggage carrier and bumper from the motor vehicle.

Any suitable latch mechanism may be employed to cooperate with the slots 8 in securing the luggage carrier 7 in its adjusted position. However, a present showing is made which consists of spring-pressed plungers 19 slidably mounted in housings 20 forming parts of the brackets and carrying flattened heads 21 to be received by the slots 8. The heads 21 also include disc-like portions 22 having cutouts 23 to receive ribs 24 in the housings 20 so that when the heads are retracted they may be turned a limited distance to position said heads at right angles to the slots 8 and thereby free the side members 6 of the luggage carrier for sliding movement in the brackets 5.

While I have shown and described the side members and brackets of angle iron construction, the luggage carrier may be made of tubular material, as shown in Figure 10, the bed-forming elements also being of cylindrical shape to harmonize therewith.

From the foregoing description taken in connection with the accompanying drawings, it will be seen that a very efficient and practical combined luggage carrier and bumper has been provided capable of easy application to a motor vehicle and may be readily adjusted to increase and decrease its load carrying capacities to suit the wishes of the user. Also, it will be noted that the device will afford maximum protection to the motor vehicle when in any of its adjusted positions. Further, by having the bed of the carrier foldable it will, when folded, protect the motor vehicle body from being chafed or contacted by any articles or devices which may be located on the carrier.

Having described the invention, I claim:

1. A combined luggage carrier and bumper comprising side members, an end member connecting said side members and providing a bumper having the upper edge thereof arranged in a plane above said side members, means slidably mounting said side members to a motor vehicle for sliding movement in a horizontal plane, means for locking said side members to said first means, a sectional bed supported by said side members and having said sections thereof hingedly connected with one section fixed to said side members whereby certain of said sections may be folded vertically to cooperate with said bumper in restricting the load carrying capacity of the device.

2. A combined luggage carrier and bumper comprising side members, an end member connecting said side members and providing a bumper, a bed carried by said side members, brackets slidably receiving said side members and secured to a motor vehicle, wedge-shaped cushion stops removably secured to the side members, said brackets having flared ends to receive the stops for limiting the sliding movement of said side members in either direction, said side members having slots, and fastening means carried by said brackets to engage with the slots for securing the side members in various adjusted positions.

HOWARD A. MONTEITH.